United States Patent [19]

Doak et al.

[11] 4,346,198

[45] * Aug. 24, 1982

[54] CLEAR IMPACT RESISTANT THERMOPLASTIC STAR-BLOCK COPOLYMERS

[75] Inventors: Kenneth Doak, Murrysville; Le-Khac Bi, West Chester; Ralph Milkovich, Paoli, all of Pa.

[73] Assignee: Atlantic Richfield Company, Los Angeles, Calif.

[*] Notice: The portion of the term of this patent subsequent to Feb. 3, 1998, has been disclaimed.

[21] Appl. No.: 243,279

[22] Filed: Mar. 13, 1981

Related U.S. Application Data

[63] Continuation-in-part of Ser. No. 167,883, Jul. 14, 1980, abandoned, which is a continuation of Ser. No. 35,047, May 1, 1979, abandoned.

[51] Int. Cl.³ .................................... C08F 297/04
[52] U.S. Cl. ................................................. 525/314
[58] Field of Search ........................... 525/314, 89, 98

[56] References Cited

U.S. PATENT DOCUMENTS

| | | | |
|---|---|---|---|
| 4,180,530 | 12/1979 | Bi | 525/98 |
| 4,248,980 | 2/1981 | Bi | 525/314 |
| 4,248,981 | 2/1981 | Milkovich | 525/314 |
| 4,248,983 | 2/1981 | Bi | 525/314 |

*Primary Examiner*—Paul R. Michl
*Attorney, Agent, or Firm*—Lewis J. Young

[57] ABSTRACT

The preparation of a branched, radial block copolymer having improved falling weight impact properties, and having monomodal distribution of molecular structure in the arms of the block copolymer is described.

6 Claims, No Drawings

CLEAR IMPACT RESISTANT THERMOPLASTIC STAR-BLOCK COPOLYMERS

CROSS-REFERENCE TO RELATED APPLICATIONS

This is a continuation-in-part of application Ser. No. 167,883, filed July 14, 1980, now abandoned, which was a continuation of application Ser. No. 35,047, filed May 1, 1979, and now abandoned.

BACKGROUND OF THE INVENTION

The present invention relates to resinous star-block copolymers having improved impact properties and good clarity.

Highly branched block copolymers, sometimes called star-block copolymers, are old in the art of anionic polymerization. These star-block copolymers are prepared by first forming linear block polymers having active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound.

Zelinski, U.S. Pat. No. 3,280,084, polymerized butadiene with butyllithium initiator to form B—Li blocks (where B is polybutadiene) which when coupled with divinylbenzene gave highly branched copolymers having polydivinylbenzene nuclei and several identical arms of polybutadiene branching therefrom. The arms can also be either random or block copolymers of styrene and butadiene (from A —B—Li blocks, where A is polystyrene segment) where the diene is the major component.

Childers, U.S. Pat. No. 3,637,554, prepares rubbery star-block copolymers having nuclei formed from polyepoxides, polyisocyanate, polyimides, etc., and identical arms from B—Li and A—B—Li.

Kitchen et al, U.S. Pat. No. 3,639,517, teaches that star-block copolymer may be formed having different molecular weight arms attached to the same nucleus. These arms are formed by using multiple additions of styrene monomer and initiator to from A—Li; A'—Li; and A"—Li, where A, A' and A" are polystyrene blocks of different molecular weights, then by a single addition of butadiene, and finally coupling these arms to form star-block copolymers having bi-, tri, and polymodal molecular weight distribution in the arms.

Fetters et al, U.S. Pat. No. 3,985,830, discloses a product having at least two star-block copolymers linked together by a linking agent, such as phosgene, silicon tetrachloride or dihalosilanes.

Fodor, U.S. Pat. No. 4,051,197, discloses blends of two star-block copolymers, each having molecular weight distribution in its arms outside a given range, to form a blend having a distribution within the given range.

Fahrback et al, U.S. Pat. No. 4,086,298, discloses star-block copolymers having a mixture of arms wherein some are formed by first polymerizing styrene with alkyllithium to form A—Li blocks, and then adding a mixture of styrene and butadiene to form a graded copolymer represented by A—B→A', where the arrow represents a graded segment. Other arms are made up on only the butadiene-styrene graded copolymer segment.

Kitchen, U.S. Pat. No. 4,091,053, teaches that star-block copolymers having long integral hinge flex life and high hardness can be made by the method of U.S. Pat. No. 3,639,517 wherein the ratio of molecular weight of the styrene blocks in a longer (A') block to that of a shorter (A) block is maintained within the range of 3 to 7.

Vreugdenhil, U.S. Pat. No. 4,092,375, makes the bimodal star-block copolymers of Kitchen, U.S. Pat. No. 3,639,517, by separately preparing blocks of A—B—Li and B—Li, and then coupling mixtures thereof.

SUMMARY OF THE INVENTION

We have now found that transparent impact resistant thermoplastic star-block copolymers can be made which have good impact resistance at room temperature.

The copolymers contain 60 to 90 percent by weight of a monovinyl aromatic compound and 40 to 10 percent by weight of a conjugated diene having 4 to 8 carbon atoms. The copolymers have the general formula $(A-A'/B)_{\overline{m}}X$ where A is a non-elastomeric polymer segment based on 80 to 95 percent by weight of the total monovinyl aromatic compound, A'/B is an elastomeric copolymer segment based on a random copolymer of the monovinyl aromatic compound (A') and the conjugated diene (B) wherein the weight ratio of A' to B must be less than 1.0, m is an integer between 8 and 12, and X is the radical of a polyfunctional coupling agent forming the nucleus of the star-block copolymer.

DETAILED DESCRIPTION OF THE INVENTION

The thermoplastic, star-block copolymers of this invention are prepared by a three-stage process of anionic polymerization.

In the first stage, 80 to 95 percent by weight of the total amount of monovinyl aromatic compound is polymerized in an inert solvent using a hydrocarbyllithium initiator to form linear segments (A—Li), of the monovinyl aromatic compound having lithium ions at the ends. The polymerization is allowed to proceed to essential completion.

In the second stage, the remainder of the monovinyl aromatic compound is added, and the conjugated diene is continuously added at a rate, determined by the amounts of total monomer and the relative copolymerization rates of the monovinyl aromatic compound and the conjugated diene, such that an essentially random copolymer segment, B/A'—Li, is formed. The overall effect is that the A—Li segments from stage one form A—B/A'—Li segments.

The second stage may also be carried out by other known means of preparing styrene/butadiene type random copolymers. For example, a mixture of the remaining monovinyl aromatic compound and all of the conjugated diene can be added continuously to the reaction solution at a rate such that an essentially random copolymer block is formed. Methods are also known for producing random copolymer blocks using as randomizer a polar compound, such as the tertiary amines, thioethers, or cyclic ethers.

In the third stage, a polyfunctional coupling agent is added to the solution of A—B/A'—Li segments and allowed to couple the segments into the radial block copolymer of general formula $(A-B/A')_{\overline{m}}X$ where m is an integer between 8 and 12, A is the non-elastomeric polymer segment based on 80 to 95 percent by weight of the total monovinyl aromatic compound, B/A' is an elastomeric copolymer segment based on a random copolymer of the monovinyl aromatic compound (A') and the conjugated diene (B) wherein the weight ratio of A' to B must be less than 1.0, and X is the radical of the polyfunctional coupling agent.

Preferred products will have elastomeric segments, B/A', whose weight ratio of A' to B is between 0.25 and 0.67, more preferably between 0.33 and 0.54.

Similarly, preferred products will have a weight ratio of non-elastomer segments, A, to elastomeric segments, B/A', of greater than 1.0, such as between 1.2 and 6.0, more preferably between 1.5 and 3.0.

The monovinyl aromatic compound useful in the invention is preferably styrene, but may be alkyl substituted styrenes which have similar copolymerization characteristics, such as the ring substituted methylstyrenes, ethylstyrenes, and t-butylstyrene.

The amount of monovinyl aromatic compound useful in the invention is between 60 and 90 percent by weight based on the total weight of monomers utilized.

The hydrocarbyllithium initiators useful in the invention are the known alkyllithium compounds, such as methyllithium, n-butyllithium, secbutyllithium; the cycloalkyllithium compounds, such as cyclohexyllithium; and the aryllithium compounds, such as phenyllithium, p-tolyllithium and napthyllithium.

The hydrocarbyllithium added in the first stage of the instant process may be varied from 0.2 to 10 millimoles per mole of total monomer. The total amount of initiator used depends on the molecular weight and number of polymer chains desired.

The conjugated diene useful in the invention are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclohexane, benzene, toluene, xylene and the like. The polymerization is carried out in the absence of air, moisture, or any other impurity which is known to be detrimental to anionic catalyst systems. The temperature of polymerization may be conventionally from 0° to 120° C., and preferably between 40° and 80° C.

The polyfunctional coupling agents suitable for the invention may be any of the materials known to have functional groups which can react with carbon to lithium bonds to add the carbon chain to the functional group. Typical examples of the suitable coupling agents are the polyepoxides, such as epoxidized linseed oil; the polyesters such as diethyl adipate; the polyhalides, such as silicon tetrahalide; the polyisocyanates, such as benzene-1,2,4-triisocyanate; the polyimines, such as tri(1-aziridinyl) phosphine oxide; the polyaldehydes, such as 1,4,7-naphthalene tricarboxaldehyde; the polyketones, such as 2,4,6-heptanetrione; the polyanhydrides, such as pyromellitic dianhydride; and the polyacid chlorides, such as mellitic acid chloride. Especially useful, and preferred herein, are the polyvinyl aromatic compounds such as divinylbenzene, which although only difunctional as monomers, can polymerize to form polyfunctional agents in situ and serve as coupling agents. Suitable are the ortho-, meta-, or para-divinylbenzenes, or mixtures thereof.

The amount and type of coupling agent used is dependent upon the number of polymer chains having lithium terminated ends and the number of arms desired per star-block molecule. Thus, for agents having a fixed number of functional groups such as silicon tetrachloride, an equivalent of agent per equivalent of lithium terminated polymer chains, gives a four armed star-block copolymer. In the case of difunctional agents which polymerize during the coupling reaction, such as divinylbenzene, the amounts of agent to be used must be determined for the conditions of reaction, since the number of equivalent functional sites is variable.

The following examples are given to illustrate the invention, but not to limit the claims. All parts and percentages are by weight unless otherwise specified.

EXAMPLE I

A one gallon stirred reactor was charged with 2,000 g. of purified cyclohexane and heated to 70° C. A trace of diphenylethylene (0.2 g.) was added to the cyclohexane by means of a hypodermic needle. A solution of secbutyllithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 22.0 m. moles of n-butyllithium and 600 g. of styrene and the reactor held at 70° C. for 20 minutes. Analysis of the solution by U.V. analysis showed that less than 0.01% by weight of the styrene monomer remained. At this point, a continuous feed of 207 g. of butadiene was added over 130 minutes using a controlled volume minipump. About 2 minutes after the start of the butadiene feed, a charge of 100 g. of styrene was added. When the last of the continuous feed was added, the whole mixture held for 30 minutes. There was then added 10.0 g. of divinylbenzene of 56% purity and the whole held for 1–2 hours at 70° C. to complete the liking reaction. The system was then terminated by the addition of 1 g. of methanol. The polymer solution was transferred to a 5 gallon polyethylene liner, diluted further with acetone and the polymer was precipitated by adding isopropanol under high speed stirring. The polymer was then treated with 1.0 part Polygard HR, a commercial antioxidant, and 0.5 part 2,6-ditertbutyl-4-methylphenol per 100 parts by weight of polymer. The wet polymer was dried by a hot air stream in a fluid bed dryer, then extruded and pelletized.

The product was analyzed and found to have about 10 linear arms which had a monomodal distribution in molecular weight prior to coupling. The arms had a number average molecular weight of about 50,000 consisting of a polystyrene block of number average molecular weight 33,000 and a block of random styrene/butadiene copolymer of number average molecular weight 17,000. Number average molecular weights were determined by Gel Permeation chromatograph using polystyrene standards. The random nature of the rubbery styrene/butadiene segments was shown by plotting Tan$\delta$ vs. Temperature (from torsion pendulum measurements) and noting the single glass transition temperature at −52° C. Injection molded tensile bars of the star-block copolymer were very transparent and the physical properties are shown in Table I. The melt index was determined by ASTM D-1238 at 200° C. under 5,000 g. load. The Gardner falling weight impact test was performed on a Gardner Variable Impact Tester manufactured by Gardner Laboratory, Inc., of Bethesda, Md. Izod unnotched impact was measured by ASTM D-256 and the Flex modulus by ASTM D-790. The overall composition of the radial block copolymer was 77.2% by weight styrene and 22.8% by weight butadiene, with 85.7% of the total styrene being in the polystyrene block segment of the arms and 14.3% of the total styrene being in the styrene/butadiene random segment. This material was free of orientation during the processing and non-stress whitening on bending.

TABLE I

|  | Ex. I | Comp. A |
|---|---|---|
| Melt Index (g./10 min) | 4.2 | 1.4 |
| Gardner Falling Weight (in.-lb.) |  |  |
| at Room Temperature | 320 | 6 |
| at −20° C. | 50 | <2 |
| Izod Impact, Unnotched (ft.-lb./in.) | 25.8 | 6.2 |
| Flex Modulus (psi) | 150,000 | 163,000 |

COMPARATIVE EXAMPLE A

A one gallon stirred reactor was charged with 2,000 g. of purified cyclohexane, heated to 70° C., and titrated with sec-butyllithium, as in Example I, to sterilize solvent and reactor. Into the closed reactor was charged 22.0 millimoles of n-butyllithium and 630 g. of styrene and the reactor held at 70° C. for 35 minutes to ensure complete polymerization of all the styrene to polystyryl chains terminated by active lithium ions. The polystyrene chains at this point had a number average molecular weight of 35,000. To this mixture was added 270 g. of butadiene and the polymerization allowed to proceed for 45 minutes to form polybutadiene blocks of number average molecular weight 15,000 at the ends of the polystyrene blocks. To the resulting mixture of linear block copolymers was added 12.0 g. of 55% divinylbenzene and the whole held for 1–2 hours at 70° C. to complete the linking reaction. The highly branched copolymers having about 10 arms, each having monomodal distribution were separated as in Example I and the physical properties measured. The results are also shown in Table I. Torsion pendulum measurements showed a Tg of −75° C., indicating that the butadiene was in the form of pure polybutadiene blocks, rather than the random styrene/butadiene blocks of Example I.

The unexpected superiority of the impact strength of the star-block copolymer of Example I over the known copolymer of the Comparative Example A is obvious from the Table I.

EXAMPLE II

A one gallon stirred reactor is charged and made ready for polymerization as in Example I. Into the closed reactor is charged 22.0 m. moles of n-butyllithium and 600 g. of styrene and the reactor is held at 70° C. for 20 minutes. At this point, a continuous feed of a mixture of 100 g. of styrene and 207 g. of butadiene is added over 130 minutes using a controlled volume minipump. When the last of the continuous feed is added, the whole mixture was held for 30 minutes. The coupling agent then added and the polymer worked up as in Example I. Analysis of the product will show that the product has the same structure and properties as the product from Example I.

We claim:

1. Star-block copolymers, of from 60 to 90% by weight of a monovinyl aromatic compound and 40 to 10% by weight of a conjugated diene of 4 to 8 carbon atoms, which have an average structure of the general formula $(A-B/A')_{\overline{m}} X$ where A is a non-elastomeric polymer segment based on the monovinyl aromatic compound, B/A' is an elastomer polymer segment based on a random copolymer of the monovinyl aromatic compound (A') and the conjugated diene (B) wherein the weight ratio of A' to B must be less than 1.0, m is an integer between 8 and 12, and X is the radical of a polyfunctional coupling agent by means of which the linear polymer blocks (A—B/A') are chemically bonded to form the star-block copolymers, wherein said segment A contains 80 to 95% by weight of the total monovinyl aromatic compound, and segment B/A' contains no significant blocks of either monovinyl aromatic compound or conjugated diene.

2. The star-block copolymer of claim 1 wherein said polyfunctional coupling agent is selected from o-divinylbenzene, m-divinylbenzene, p-divinylbenzene, and mixtures thereof.

3. The star-block copolymer of claim 1 wherein said polyfunctional coupling agent is selected from polyepoxides, polyesters, polyhalides, polyisocyanates, polyimines, polyaldehydes, polyketones, polyanhydrides, and polyacid chlorides.

4. The star-block copolymer of claim 1 wherein the monovinyl aromatic compound is styrene, the conjugated diene is butadiene, and the polyfunctional coupling agent is divinylbenzene.

5. A highly branched 8 to 12 armed, resinous star-block copolymer having 60 to 90% by weight of a monovinyl aromatic compound and 40 to 10% by weight of a conjugated diene when prepared by a process consisting of
(a) polymerizing in a first stage of the process, from 80 to 95% by weight of the total amount of monovinyl aromatic compound in an inert solvent, in the presence of a relatively small amount of hydrocarbyllithium initiator until conversion is virtually complete,
(b) in a second stage of the process, adding to the reaction solution the remaining monovinyl aromatic compound and continuously adding the conjugated diene at a rate such that the monovinylaromatic compound and conjugated diene copolymerize in an essentially random fashion until conversion is again essentially complete, and
(c) thereafter subjecting the resulting mixture of linear block and random copolymers with active terminal lithium to carbon bonds to a coupling reaction, by adding a polyfunctional coupling agent, to form a branched block copolymer and finally isolating the branched block copolymer.

6. A highly branched 8 to 12 armed, resinous star-block copolymer having 60 to 90% by weight of a monovinyl aromatic compound and 40 to 10% by weight of a conjugated diene when prepared by a process consisting of
(a) polymerizing in a first stage of the process, from 80 to 95% by weight of the total amount of monovinyl aromatic compound in an inert solvent, in the presence of a relatively small amount of a hydrocarbyllithium initiator until conversion is virtually complete,
(b) in a second stage of the process, continuously adding to the solution a mixture of the remaining monovinyl aromatic compound and all of the conjugated diene at a rate such that the monovinyl aromatic compound and conjugated diene copolymerize in an essentially random fashion until conversion is again essentially complete, and (c) thereafter subjecting the resulting mixture of linear block and random copolymers with active terminal lithium to carbon bonds to a coupling reaction, by adding a polyfunctional coupling agent, to form a branched block copolymer and finally isolating the branched block copolymer.

* * * * *